United States Patent

Kelly et al.

(10) Patent No.: US 8,142,563 B2
(45) Date of Patent: Mar. 27, 2012

(54) SOY FLOUR SLURRY AND METHOD OF PROVIDING SAME

(75) Inventors: Michael DeWayne Kelly, North Wales, PA (US); Joseph Manna, Quakertown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 522 days.

(21) Appl. No.: 12/381,416

(22) Filed: Mar. 11, 2009

(65) Prior Publication Data

US 2009/0232953 A1 Sep. 17, 2009

(51) Int. Cl.
C08L 1/00 (2006.01)

(52) U.S. Cl. ......................................... 106/162.1

(58) Field of Classification Search .................. None
See application file for complete search history.

(56) References Cited

U.S. PATENT DOCUMENTS

| 4,301,266 | A |  | 11/1981 | Muenster et al. |  |
|---|---|---|---|---|---|
| 4,681,686 | A |  | 7/1987 | Richardson et al. |  |
| 4,774,303 | A |  | 9/1988 | Denzinger et al. |  |
| 6,489,287 | B1 |  | 12/2002 | Gauthier et al. |  |
| 7,416,598 | B2 |  | 8/2008 | Sun et al. |  |
| 2005/0070186 | A1 | * | 3/2005 | Shoemake et al. | 442/176 |
| 2006/0199756 | A1 |  | 9/2006 | Creamer et al. |  |
| 2008/0004376 | A1 | * | 1/2008 | Jong | 524/17 |
| 2008/0021187 | A1 | * | 1/2008 | Wescott et al. | 527/301 |

FOREIGN PATENT DOCUMENTS

| CN | 1329194 A | 1/2002 |
|---|---|---|
| CN | 1670111 A | 9/2005 |
| EP | 1054103 A | 11/2000 |
| JP | 49059158 A | 6/1974 |
| WO | WO 2004/061038 A | 7/2004 |
| WO | WO 2006/047651 A | 5/2006 |
| WO | WO 2007/139503 | 12/2007 |

OTHER PUBLICATIONS

J.M. Westcott, et al, "Durable Soy-Based Adhesive Dispersions",Wood Adhesives 2005: Forest Products Society, 2005: pp. 263-269.
Jong, Lei, Characterization of Defatted Soy Flour and Elastomer Composites, Journal of Applied Polymer Science. 98(1):353-361, 2005.
A. Malhotra, J.N. Coupland, The Effect of Surfactants on the Solubility, Zeta Potential, and Viscosity of Soy Protein Isolates, Food Hydrocolloids V. 18, Issue 1, Jan. 2004.

* cited by examiner

*Primary Examiner* — Melvin Mayes
*Assistant Examiner* — Stefanie Cohen
(74) *Attorney, Agent, or Firm* — Andrew E. C. Merriam

(57) ABSTRACT

A stable aqueous soy flour slurry comprising defatted soy flour, water, and a water soluble polymer dispersing agent having a molecular weight in the range of from 1,000 to 20,000, wherein the viscosity of the slurry is in the range from 200 to 2,000 cps as measured by a DV-III Ultra LV Viscometer viscometer at 6 rpm using spindle #31 at 25° C.; and a method for providing such a slurry.

10 Claims, 2 Drawing Sheets

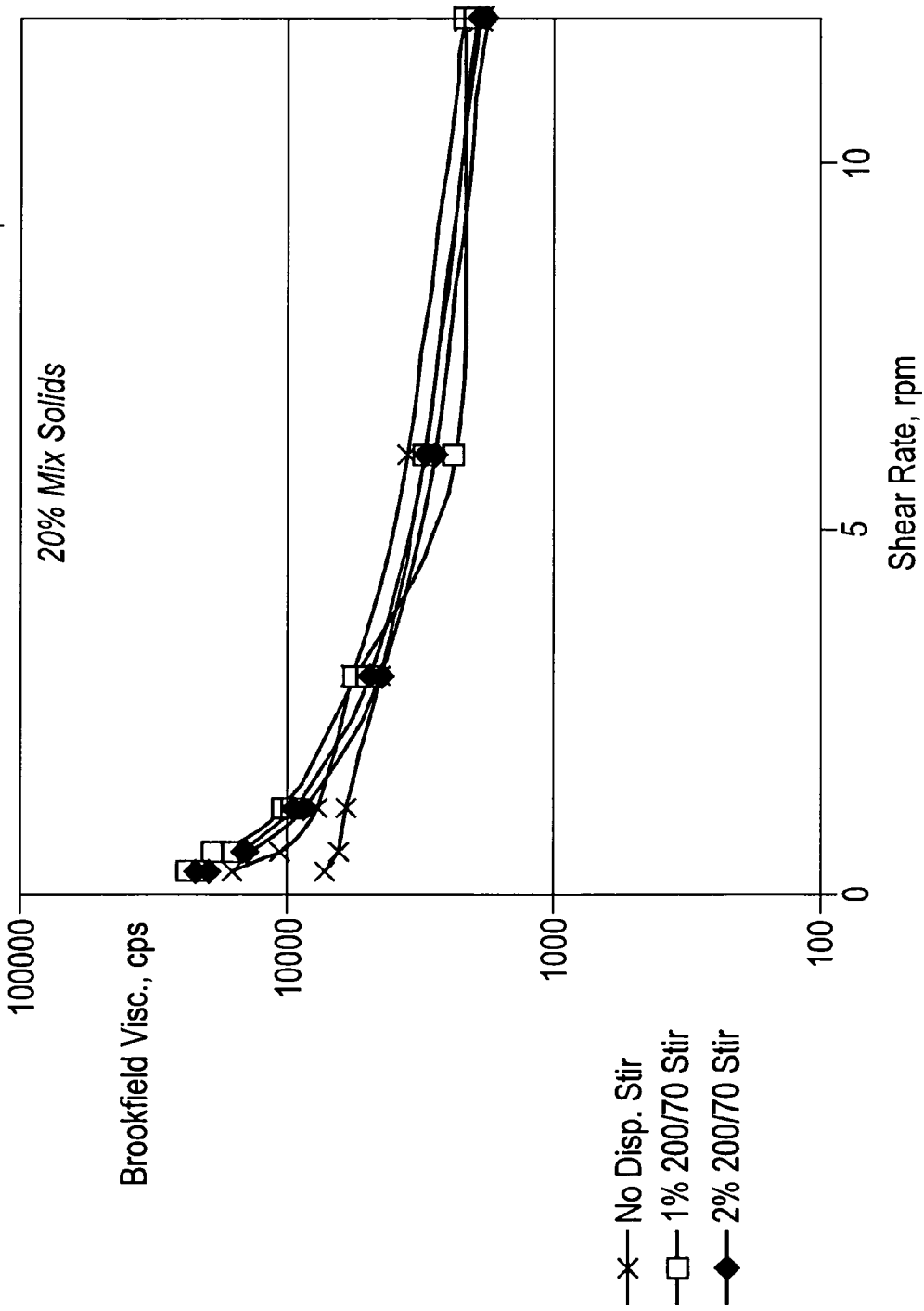

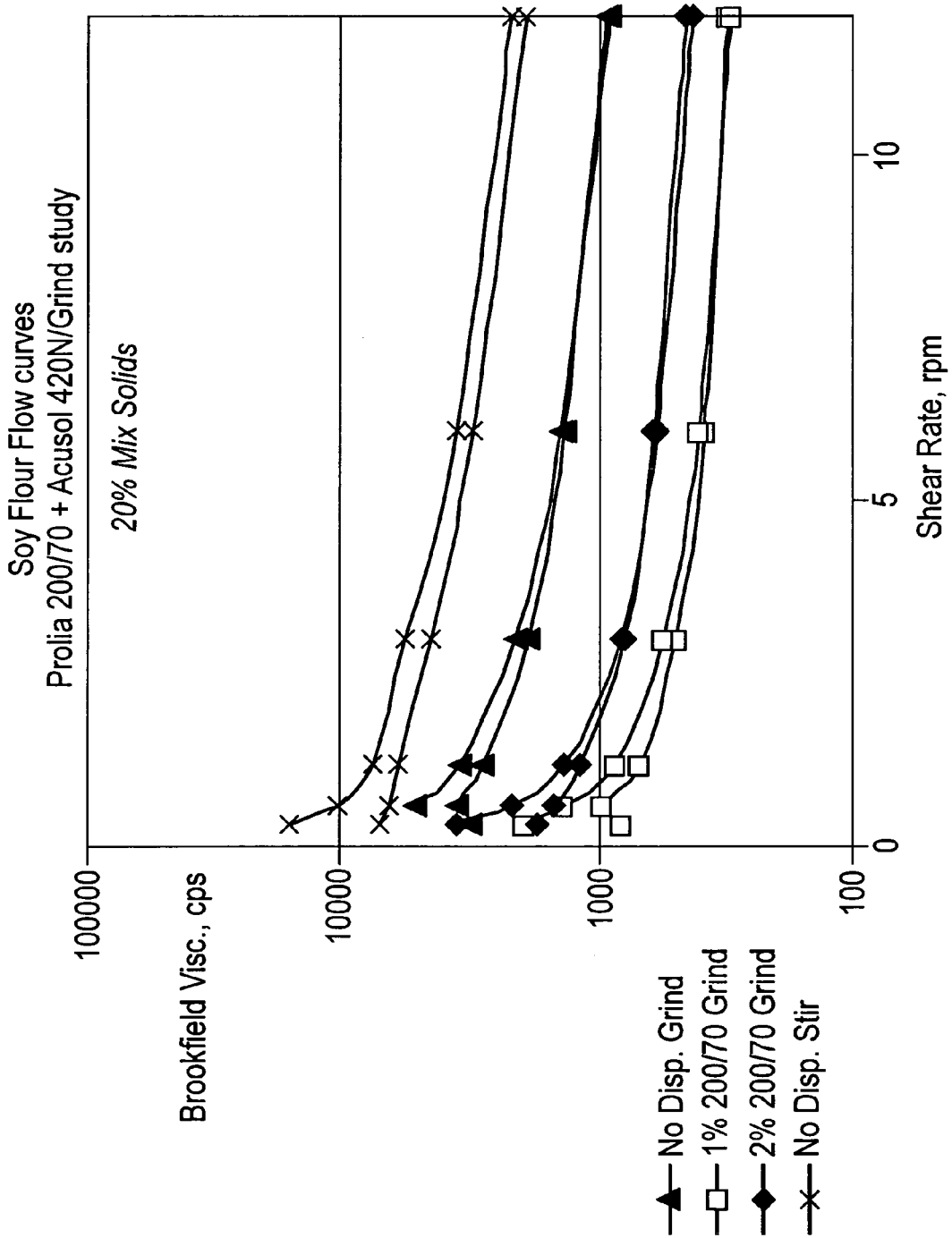

SOY FLOUR SLURRY AND METHOD OF PROVIDING SAME

This application claims the benefit of priority under 35 U.S.C. §119(e) of U.S. Provisional Patent Application 61/069,366, filed Mar. 14, 2008.

This invention is a stable aqueous soy flour slurry comprising defatted soy flour, water, and a water soluble polymer having a molecular weight in the range of from 1,000 to 20,000, wherein the viscosity of the slurry is in the range from 200 to 2,000 cps as measured by a DV-III Ultra LV Brookfield viscometer at 6 rpm using spindle #31 at 25° C.; and a method for providing such a slurry. The method for dispersing soy flour in water comprises admixing the defatted soy flour with water and grinding with a high shear Cowles-type dissolver in the presence of a water soluble polymer dispersing species to stabilize the soy particles.

Due to their excellent cost/performance ratio, phenol/formaldehyde (PF) or urea/formaldehyde (UF) resins have found use in a multitude of applications, including thermosetting binders for fiberglass insulation or roofing mats, and resins for exterior and interior wood composites. However, curable compositions containing little or no formaldehyde are now highly desirable in a variety of products, due to the health and environmental problems associated with formaldehyde. Existing commercial formaldehyde-free binders contain a carboxylic acid polymer and a polyol that esterify and form a thermoset when heat cured.

Although these formaldehyde-free binders are suitable in use, manufacturers are looking for cheaper formaldehyde-free alternatives to PF and UF resins. Natural products have previously been considered and, indeed, there were soy-based binders used in wood composite structures even before the development, in the 1940's, of the PF and UF resins. Soy-based resins could not maintain a cost advantage over the PF/UF resins because of the amount of processing involved to make them usable.

The soy material is commercially available in the form of ground whole beans (including the hulls, oil, protein, carbohydrate, minerals, etc.), a meal (extracted or partially extracted), a flour (i.e., generally containing less than about 1.5% oil and about 30-35% carbohydrate), or an isolate (i.e., a highly processed and substantially pure protein flour containing less than about 0.5% oil and less than about 5% carbohydrate). As used herein, "flour" includes within its scope material that fits the definitions of defatted soy flour, soy protein concentrate, and soy protein isolate. As used herein, the term "defatted soy flour" is used to exclude both the concentrate and the isolate, as is customary usage in the art, while still referring to a flour where the oil has been removed ("defatted") to levels below 1.5%.

Most practitioners that use soy protein utilize the soy isolate or the soy concentrate because of the greater ease of processing; they are largely water soluble. But both the soy concentrate and isolate are too prohibitively expensive to gain any widespread use as binders. Either the whole ground soy bean or the defatted soy flour would be a more attractive starting point from the perspective of cost, but both are insoluble in water and difficult to work with.

What is needed is an economical, environmentally-friendly (i.e. waterborne and formaldehyde-free) soy-based resin that is easily processed and usable for the end manufacturer. Such a soy-based resin may, or may not, need to be polymer-modified in order to match the performance characteristics of the PF/UF resin binders. To this end, manufacturers desire a stable, stand-alone dispersion of fine soy particles that can be used in a blend. Additionally, the particle size must be sufficiently fine such that particulate matter does not adversely effect either the aesthetic or functional properties of the resin. For example, many manufacturers apply this type of resin to a fibrous substrate (e.g. fiberglass for insulation, or glass mats for roofing shingles) by means of a curtain coating technique, whereby excess water and dispersed resin is removed by vacuum suction from below the fibrous substrate for subsequent reclaim and recycle. In this common assembly, the undesirable large particulate material would actually be preferentially captured onto the substrate since the fibers act like a filter.

Wescott et al., Wood Adhesives 2005: Session 3A—Bio-Based Adhesives, p. 263-269, describe a durable soy-based adhesive dispersion. However, these systems still involve considerable processing of the soy component, soybean flour. In particular, the soy flour is first denatured to expose the polar backbone amide and polar side chain groups, and, moreover, the soy flour is dispersed in a mixture of formaldehyde and phenol with heat. Both steps add considerable cost for the manufacturer, but the formaldehyde treatment is particularly undesirable for the fast-emerging formaldehyde-free segment of the resin binder market.

Thus, there remains a need for a method of dispersing the cheaper alternative sources of soy, such as defatted soy flour. The inventors have surprisingly developed a method for preparing defatted soy flour in a stable, formaldehyde-free, usable (low viscosity) dispersed form in water. The method comprises admixing the defatted soy flour with water and grinding with a high speed Cowles dissolver in the presence of a water soluble polymer dispersing agent to stabilize the soy particles.

This invention is an aqueous soy flour slurry comprising: (i) from 10 to 60 weight percent defatted soy flour based on the total weight of the slurry, (ii) from 0.2% to 4% by weight, based on the weight of polymeric active ingredient as a percentage of the total weight of the slurry, of a water soluble polymer dispersing agent made by the polymerization of ethylenically unsaturated monomers and having a molecular weight in the range of from 1,000 to 20,000, and (iii) water, wherein the viscosity of the slurry is in the range from 200 to 2,000 cps at 25° C.

In one embodiment of the invention, the water soluble polymer dispersing agent is a polycarboxy (co)polymer or salt thereof.

In one embodiment of the invention, the water soluble polymer dispersing agent is a homopolymer or copolymer comprising polymerized units derived from one or more monomers selected from the group consisting of (meth)acrylic acid, (meth)acrylates, maleic acid; anhydrides thereof; and salts thereof.

In another embodiment, the water soluble polymer dispersing agent comprises a water soluble phosphorous containing polymer.

In one embodiment, the water soluble polymer dispersing agent has molecular weight of less than 10,000. In another embodiment, the water soluble polymer dispersing agent has molecular weight of less than 5,000.

This invention is also a method for providing an aqueous soy flour slurry comprising the steps of: (a) forming an admixture comprising: (i) from 10 to 60 weight percent defatted soy flour based on the total weight of the slurry, (ii) from 0.2% to 4% by weight, based on the weight of polymeric active ingredient as a percentage of the total weight of the slurry, of a water soluble polymer dispersing agent made by the polymerization of ethylenically unsaturated monomers and having a molecular weight in the range of from 1,000 to 20,000, and (iii) water; and (b) mixing at high shear until the viscosity of the slurry is in the range from 200 to 2,000 cps.

In one embodiment of this method, the mixing (b) is performed using a high shear Cowles-type dissolver.

In one embodiment of this method, the mixing (b) is performed using a high-shear dispersing impeller.

In one embodiment of this method, the water soluble polymer dispersing agent is a polycarboxy (co)polymer or salt thereof.

In one embodiment of the method, the water soluble polymer dispersing agent is a homopolymer or copolymer comprising polymerized units derived from one or more monomers selected from the group consisting of (meth)acrylic acid, (meth)acrylates, maleic acid; anhydrides thereof; and salts thereof.

In one embodiment of the method, the water soluble polymer dispersing agent has molecular weight of less than 10,000. In another embodiment, the water soluble polymer dispersing agent has molecular weight of less than 5,000.

Other aspects of this invention are discussed below.

BRIEF DESCRIPTION OF THE DRAWINGS

FIG. 1 depicts the Soy Flour Flow Curves for which Brookfield Viscosity, in cps, is plotted against Shear Rate (rpm) for one embodiment of the present invention (the use of Prolia™ 200/70 defatted soy flour and Acusol™420N water soluble polymer). FIG. 1A illustrates the viscosity curves that result, when the admixture is stirred using a benchtop stirrer (Comparative Examples); FIG. 1B illustrates the viscosity curves that result when the admixture is ground using a Cowles high shear dissolver (Inventive Examples).

Prolia™ is a trademark of Cargill, Inc. (Minneapolis, Minn., USA), and Acusol™ is a trademark of the Rohm and Haas Company (Philadelphia, Pa., USA).

As discussed above, soy material can be procured in the form of ground whole beans, a meal, a flour, or an isolate. Although "flour" includes within its scope material that fits both the definitions of defatted soy flour and isolate (or concentrate), it is noted that the term "defatted soy flour" does not refer to the protein isolate (or concentrate).

Although any source of soy protein (such as soybean flour or soybean meal) may be suitable for use as the binder modifier in the end product, ordinary defatted soy flour is the most abundant and cost-effective. This source of soy protein is essentially free of functional urease. Information on soy protein can be found in, for example, Kirk-Othmer, Encyclopedia of Chemical Technology, Fourth Edition, Volume 22, pp. 591-619 (1997).

Preferably, the initial source of soy has a particle size (as determined by the largest dimension) of less than about 0.1 inch (0.25 cm), and more preferably less than about 0.05 inch (0.125 cm). If the particle size is much larger than this, the protein material may not be sufficiently soluble or dispersible to produce a binder suitable for making fiber mats with optimum properties. As a consequence, the resultant fiber mats may have lessened tensile properties and poorer visual aesthetics. In those embodiments where the soy is blended with a polymer before application to the fiber mat, the time required to homogeneously disperse the material tends to be undesirably longer with larger particles. Alternatively, if the soy is applied to the wet-laid mat separate from the remaining components of the binder, one may not get a smooth, aesthetically acceptable cured mat using larger sized particles. For either mode of application, the large particles are undesirable because the fiber mat effectively filters the large particles and captures them on the surface of the substrate.

For these reasons, a soy flour is more preferred because of its generally smaller particle size distribution, i.e., about 0.005 inch (0.013 cm). Typically, dry extracted soy meal is ground so that nearly all of the flour passes through an 80 to 100 mesh screen. In certain applications for which a stable soy flour slurry is needed, flour milled to pass through higher mesh screen is preferred. There does not appear to be a minimum particle size requirement for the ground soy; however, the particle size of commercially available soybean flour and defatted soy flour is generally less than about 0.003 inch (0.008 cm). For example, in some commercially available soybean flour, greater than about 92% passes through a 325 mesh screen, which corresponds to a particle size of less than about 0.003 inch (0.008 cm). Thus, a wide range of soy flours may be suitable, such as a flour having at least 90 to 95% of its particles smaller than 100 mesh, smaller than 200 mesh, or smaller than 400 mesh. In the present invention, a mesh size of 325 is preferred, and a mesh size of 400 or higher is most preferred.

Manufacturers of defatted soy flour characterize the Protein Dispersibility Index (PDI) as a means of comparing the dispersibility of a protein in water. In one method of determining the PDI, a sample of the soybeans are ground, mixed with a specific quantity of water, and the two are then blended together at a specific rpm for a specified time. The resulting mixture and original bean flour then have their protein nitrogen content measured using a combustion test, and the PDI is calculated as the percentage of the protein nitrogen concentration in the mix divided by the percentage in the flour—a PDI of 100 therefore indicates total dispersibility of the protein content present in the soy flour. It should be noted that the total solubility of a given flour may be less than the PDI, according to the carbohydrate content. It has been shown that the PDI can be affected, not only by the type of soybean used, but also by manufacturing processes; for example, heat treatment has been shown to lower the PDI.

Defatted soy flour products are typically offered at PDI values of 20, 70, and 90. Those having higher PDI values, such as 90, have generally been preferred since they have higher levels of soluble proteins which are useful for their binding characteristics. However, the insolubility of the carbohydrate content still prevents solubility of the defatted soy flour.

Prospective manufacturers of waterborne soy-based binders require a stable homogeneous aqueous dispersion of fine particle size soy, provided at a useful solids content (about 5% to 25% solids, or even higher, in the aqueous dispersion), at a stable viscosity that allows for facile stirring and transfer through pouring or pumping. It has been found that the minimally processed grades of soy flour cannot be simply stirred into water to produce such a dispersion. Thus, the use of low shear pumps and blending mixers fail to produce commercially useful dispersions. However, somewhat useful viscosities can be achieved by grinding using a high shear Cowles dissolver. Other high speed shear apparatus that can achieve similar results and are thus in accordance with the present invention include, but are not limited to: (a) high speed shear impellers or pumps rotating at speeds in the range 1,000-3,500 rpm, preferably 2,000-3,500 rpm, (e.g. Tri-Blender by Ladish Company, Tri-Clover Division); (b) homogenizers (e.g. Oakes Mixer by Oakes Machine Corp.); and (c) high speed agitators, mixers, or turbines (e.g. the "Likwifier" turbine mixer by Lanco and the mixers and aerators by "Lightnin" Co.). Herein, "high shear Cowles-type dissolver" refers to all of these types of high speed shear apparatus, as is known in the art. The mechanical shear may be provided by any suitable apparatus, but must be sufficient to reduce the viscosity of the soy flour dispersion to below 5000 cps, preferably below 1500 cps as measured on a DV-III Ultra LV Brookfield viscometer at 6 rpm using spindle #31 at 25° C. Although viscosities of approximately 1,000 cps can be attained using high shear grinding apparatus, even lower viscosities of approximately 600-800 cps, or even 400-600 cps, are preferred by the end-manufacturers for ease of use.

In a preferred embodiment of this invention, it has been found that the addition of a water-soluble polymer species can be used advantageously in the high shear grinding process in order to attain the even more desirable viscosity ranges, approximately 400 to 600 cps, for the soy flour dispersions. That is, the inventors have found that high shear grinding is effective in breaking down particle agglomerates, but that even small particles are susceptible to re-agglomeration. The addition of solubilizing species, such as water-soluble polymer species, aids in stabilizing the fine particles and preventing re-agglomeration. Moreover, slurries of higher PDI defatted soy flours exhibit much lower viscosities when ground under high shear in the presence of such water soluble polymer dispersing species.

The water soluble polymer of the present invention may be made by any polymerization method, including, for example, solution polymerization, bulk polymerization, heterogeneous phase polymerization (including, for example, emulsion polymerization, suspension polymerization, dispersion polymerization, and reverse-emulsion polymerization), and combinations thereof, as is known in the art.

The molecular weight of such polymeric species may be controlled by the use of a chain regulator. A chain regulator is a compound that acts to limit the length of a growing polymer chain. Some suitable chain regulators are, for example, sulfur compounds, such as mercaptoethanol, 2-ethylhexyl thioglycolate, thioglycolic acid, and dodecyl mercaptan. Typically, the amount of chain regulator, as a percentage by weight based on the total weight of all monomers used, is 20% or less, more commonly 7% or less, as is known in the art.

Another known method of controlling molecular weight involves performing the polymerization in the presence of a secondary C2-C6-alcohol or mixtures thereof with water, such as isopropanol or sec-butanol or mixtures thereof with water, as described, for example, in U.S. Pat. Nos. 4,301,266 and 4,774,303. Many methods of chain regulation can effect a change to the polymer, for example, resulting in a polymer end group related to the chain regulator. Thus, for example, the use of isopropanol as a chain regulator may result in isopropyl and/or lactone end groups on the polymer.

Preferably, the weight average molecular weight of the water soluble polymer is from about 300 to about 100,000, or about 1,000 to 100,000, more preferably 1,000 to 20,000, or 2,000 to 20,000, and even more preferably from 2,000 to 5,000, or from 2,000 to 3,000.

The water soluble polymer of the present invention may be generated from at least one anionic monomer. Anionic monomers are compounds that form polymerized units in which at least one anion is covalently attached to the polymer backbone. The counter cation or cations corresponding to the covalently-attached anion or anions may be in solution, in a complex with the anion, located elsewhere on the polymer, or a combination thereof. In some embodiments, one or more anionic monomers are used that contain an anion that exists in anionic form when residing in water at some range of pH values, while that anion may be in neutral form at some other pH values.

Some suitable anionic monomers are, for example, ethylenically unsaturated acid monomers, including, for example, ethylenically unsaturated carboxylic acid monomers, maleic monomers, and ethylenically unsaturated sulfonic acid monomers. Suitable unsaturated carboxylic acid monomers include, for example, acrylic acid, crotonic acid, itaconic acid, 2-methyl itaconic acid, $\alpha,\beta$-methylene glutaric acid, and monoalkyl fumarates; methacrylic acid, and mixtures thereof. Suitable maleic monomers include, for example, maleic acid, maleic anhydride, and substituted versions thereof. Suitable unsaturated sulfonic acid monomers include, for example, 2-(meth)acrylamido-2-methylpropanesulfonic acid and para-styrene sulfonic acid.

The water soluble polymer of the present invention may optionally involve the use of at least one cationic monomer. Cationic monomers are compounds that form polymerized units in which at least one cation is covalently attached to the polymer. The counter anion or anions corresponding to the covalently-attached cation or cations may be in solution, in a complex with the cation, located elsewhere on the polymer, or a combination thereof. In some embodiments, one or more cationic monomers are used that contain a cation that exists in cationic form when residing in water at some range of pH values, while that cation may be in neutral form at some other pH values. Alternatively, in some embodiments, one or more cationic monomers are used that contain a cation that is permanently in cationic form, such as, for example, a quaternary ammonium salt, as well as other suitable cationic monomers, as is known in the art, and described, for example, in United States Patent Application Publication No. US 2006/0199756 A1, paragraphs [0061] to [0066].

In some embodiments, the polymer optionally contains no polymerized units from any monomer that is neither a cationic monomer nor an anionic monomer. In some embodiments, the polymer contains at least one polymerized unit from a nonionic monomer (i.e., a monomer that is neither a cationic monomer nor an anionic monomer). Some suitable nonionic monomers are, for example, ethylenically unsaturated nonionic compounds, including compounds with one double bond, two double bonds, or more double bonds. Suitable ethylenically unsaturated nonionic monomers include, for example, olefins, substituted olefins (including, for example, vinyl halides and vinyl carboxylates), dienes, (meth)acrylates, substituted (meth)acrylates, (meth)acrylamide, substituted (meth)-acrylamides, styrene, substituted styrenes, and mixtures thereof. As used herein "(meth)acrylates" are esters of acrylic acid and methacrylic acid; and "substituted" refers to any substituent group, including, for example, halogens, hydroxyl groups, alkyl groups, vinyl groups, (meth)acrylic groups, glycidyl groups, hydroxyalkyl groups, alkylene oxide groups, polyalkylene oxide groups, and combinations thereof. In some embodiments, one or more nonionic monomers are used that are selected from the group of (meth)acrylate esters, substituted (meth)acrylate esters, (meth)acrylamide, substituted (meth)acrylamide, and mixtures thereof. In some embodiments, acrylamide or methacrylamide or a mixture thereof is used.

In one preferred embodiment, the water soluble polymer species is a polycarboxy (co)polymer which contains at least two carboxylic acid groups, anhydride groups, or salts thereof. Ethylenically unsaturated carboxylic acids such as, for example, methacrylic acid, acrylic acid, crotonic acid, fumaric acid, maleic acid, 2-methyl maleic acid, itaconic acid, 2-methyl itaconic acid, $\alpha,\beta$-methylene glutaric acid, monoalkyl maleates, and monoalkyl fumarates; ethylenically unsaturated anhydrides such as, for example, maleic anhydride, itaconic anhydride, acrylic anhydride, and methacrylic anhydride; and salts thereof, at a level of from about 1% to 100%, by weight, based on the weight of the addition polymer, may be used. Additional ethylenically unsaturated monomer may also be present.

In a preferred embodiment the water soluble polymer is in the form of a solution of the polycarboxy (co)polymer in an aqueous medium such as, for example, a polyacrylic acid homopolymer or an alkali-soluble resin which has been solubilized in a basic medium, the weight average molecular weight may be from about 300 to about 100,000, or 1,000 to 100,000. Preferred is a molecular weight from about 1,000 to about 20,000, or 2,000 to 20,000, more preferably from about 2,000 to about 5,000, or from 2,000 to 3,000.

In one such embodiment, the polycarboxy addition (co) polymers may be oligomers or co-oligomers of ethylenically-unsaturated carboxylic acids prepared by free radical addition polymerization, having a number average molecular weight of from 300 to 1000. In another embodiment, the polymer species is a polyacrylic acid homopolymer (pAA) for which a weight average molecular weight of no greater than 20,000, is suitable, more preferably no greater than 10,000, or no greater than 5,000, or even more preferably no greater than 3,000, and with 500-2,000 or 2,000-3,000 being advantageous. Many commercial dispersants and species of similar composition can function as the water soluble polymer. The polymers used as additives in these compositions can be neutralized with $NH_4OH$ if desired.

Other commercial dispersants, many of which have a weight average molecular weight of less than 100,000, are contemplated to be candidates that would be similarly operative in achieving desirably low viscosities for soy flour slurries. These include, for example, the Acumer™ and Acusol™ line of products, available from the Rohm and Haas Company (Philadelphia, Pa., USA).

In another embodiment, the water soluble polymer dispersing agent is a water soluble phosphorous-containing polymer, or salt thereof. Such polymers are known in the art, see, for example, U.S. Pat. Nos. 6,489,287 and 4,681,686, and may comprise, for example, phosphonate groups of the type A-P(O)(OX)$_2$ or A-P(O)(OX)(B), wherein A is a polymer comprising ethylenically unsaturated monomers; B is a hydrogen, phenyl, C1-C6 alkyl, or is a polymer consisting of ethylenically unsaturated monomers; and X is hydrogen, an alkali metal, an alkaline earth metal, ammonium or an amine residue.

In another embodiment, the water soluble polymer dispersing agent is a similarly low molecular weight polyaspartic acid species. These species are also known in the art; see, for example, Biopolymers, A. Steinbüchel, Ed., Wiley-VCH, Weinheim, 2003, Vol. 7, p. 175.

In another embodiment, the water-soluble polymer comprises a mixture of the polymer dispersants described herein.

Water soluble (co)polymer molecular weights reported herein, unless otherwise indicated, are weight average molecular weights, Mw, as measured by gel permeation chromatography (GPC) using polyacrylic acid standards, as is known in the art. Gel permeation chromatography, otherwise known as size exclusion chromatography, actually separates the members of a distribution of polymer chains according to their hydrodynamic size in solution rather than their molar mass. The system is then calibrated with standards of known molecular weight and composition to correlate elution time with molecular weight. The techniques of GPC are discussed in detail in Modern Size Exclusion Chromatography, W. W. Yau, J. J Kirkland, D. D. Bly; Wiley-Interscience, 1979, and in A Guide to Materials Characterization and Chemical Analysis, J. P. Sibilia; VCH, 1988, p. 81-84. The molecular weights reported herein for Mw are in daltons.

The water-soluble polymer species is added at a low level, typically 0.1-5%, preferably 0.2-4%, and more preferably 0.5-3%, or 1-2%, based on the weight of the polymeric active ingredient as a percentage of the total weight of the slurry, and functions as a dispersant for the soy flour particles in reducing the viscosity of the slurry.

The aqueous soy flour slurry may comprise 5-95 wt % defatted soy flour, based on the total weight of the slurry, preferably 10-60 wt %, or 10-40 wt %, and most preferably 10-30 wt %, or 15-25 wt % defatted soy flour. The viscosity of the aqueous soy flour slurry is from 100 to 3,000 cps, preferably 200 to 2,000 cps, or 200 to 1,000 cps, and more preferably 200 to 800 cps, or 200 to 600 cps.

A particularly preferred embodiment of the invention, described in the Examples, is represented by the stable aqueous soy flour slurry comprising 10-60% defatted soy flour, preferably about 20%, based on the total weight of the slurry, the aqueous slurry being formed by high shear mixing on a Cowles dissolver in the presence of 1-2% of a water soluble polymer, such as Acusol™ 420N. This type of slurry is stable to settling, has a viscosity that is both convenient for use for the end-manufacturer, approximately 400-600 cps, and has minimal viscosity drift.

As used herein, the phrase "alkyl" means any aliphatic alkyl group having one or more carbon atoms, the alkyl group including n-alkyl, s-alkyl, i-alkyl, t-alkyl groups or cyclic aliphatics containing one or more 5, 6 or seven member ring structures.

As used herein, the phrase "aqueous" or "aqueous solvent" includes water and mixtures composed substantially of water and water-miscible solvents.

As used herein, the phrase "stable aqueous defatted soy flour slurry" is used to describe a dispersion of defatted soy flour in water comprising water-insoluble particulate soy material which is stable with respect to particles settling to any appreciable extent, and is not susceptible to viscosity drift to any appreciable extent.

As used herein, "wt %" or "wt. percent" means weight percent based on solids.

As used herein, unless otherwise indicated, the word "copolymer" includes, independently, copolymers, terpolymers, block copolymers, segmented copolymers, graft copolymers, and any mixture or combination thereof. (Co) polymer means homopolymer or copolymer.

As used herein, the phrase "emulsion (co)polymer" means (co)polymers dispersed in an aqueous medium that has been prepared by emulsion polymerization.

As used herein, the phrase "formaldehyde-free composition" refers to compositions substantially free from added formaldehyde, and which do not liberate substantial formaldehyde as a result of drying and/or curing.

As used herein, the term "(meth)acrylate" means acrylate, methacrylate, and mixtures thereof and the term "(meth) acrylic" used herein means acrylic, methacrylic, and mixtures thereof.

As used herein, the phrases "($C_3$-$C_{12}$)—" or "($C_3$-$C_6$)—" and the like refer to organic compounds or structural portions of organic compounds containing 3 to 12 carbon atoms and 3 to 6 carbon atoms, respectively.

As used herein, unless otherwise indicated, the phrase "molecular weight" refers to the weight average molecular weight of a polymer as measured by gel permeation chromatography (GPC).

As used herein, unless otherwise indicated, the term "viscosity" refers to viscosity as measured on a DV-III Ultra LV Brookfield viscometer at 6 rpm using spindle #31 with sample temperature maintained at a constant 25° C.

As mentioned earlier, soy-based binders find utility as wood composite binders. The soy-based binders are also useful to bind non-woven webs, among other things. "Non-woven web(s)" refers to any article or sheet-like form made from natural and/or synthetic fibers wherein the fibers are aligned in a random or semi-random order (i.e., not deliberately, ordered). One skilled in the art understands that formation of some order occurs during the web forming process (primarily in the machine direction); however, this is completely different from the ordering obtained from traditional weaving or knitting processes. Suitable fibers for use in forming the web include, but are not limited to, fiberglass, cellulose, modified cellulose (cellulose acetate), cotton, polyesters, rayon, polyacrylonitrile (PAN), polylactic acid (PLA), polycaprolactone (PCL), polyolefins and bi-component fiber comprising two or more fiber-forming polymers such as polypropylene and polyethylene terephthalate and the like. Included in the definition of non-woven webs suitable for use with these soy-based binders are porous films prepared by the action of chemical or mechanical processing (e.g., apertured films). Paper and paper products may also be useful as substrates for these soy-based binders. The latter will find utility with any weight of non-woven web and will depend greatly on the requirements of the particular application. Manufacturing processes for making non-woven webs are well known in the art. These include, for example, wet-laid, air-laid (dry laid), spunbond, spunlace, meltblown and needle punch. Particularly suitable webs will have a base weight (i.e., the weight of the web before any coating or treatments are applied) of less than about 100 grams per square meter (gsm). In another aspect the webs will have a base weight of less than about 20 gsm.

Non-woven fabrics are composed of fibers which can be consolidated in whole or in part by mechanical means such as, for example, by entanglement caused by needle-punching, by an air-laid process, and by a wet-laid process; by chemical means such as, for example, treatment with a polymeric binder; or by a combination of mechanical and chemical means before, during, or after nonwoven fabric formation. Some non-woven fabrics are used at temperatures substantially higher than ambient temperature such as, for example, glass fiber-containing non-woven fabrics which are impregnated with a hot asphaltic composition pursuant to making roofing shingles or roll roofing material. When a non-woven fabric is contacted with a hot asphaltic composition at temperatures of from 150° C. to 250° C., the non-woven fabric can sag, shrink, or otherwise become distorted. Therefore, non-woven fabrics which incorporate a soy-based resin composition should substantially retain the properties contributed by the aqueous resin composition such as, for example, tensile strength. In addition, the aqueous resin composition should not substantially detract, from essential non-woven fabric characteristics, as would be the case, for example, if the cured composition were too rigid or brittle or became sticky under processing conditions.

Preferably, the binder compositions of the fiber mats are formaldehyde-free. Thus, any formaldehyde treatment or formaldehyde modification, of the soy component of the soy-based binder should be avoided. Additionally, for polymer-modified soy-based binders, in order to minimize the formaldehyde content of the aqueous binder composition, it is preferred, when preparing the polymer for the polymer-containing formaldehyde-free composition, to use polymerization adjuncts and additives such as, for example, initiators, reducing agents, chain transfer agents, curing agents, biocides, surfactants, emulsifiers, coupling agents, anti-foaming agents, dust suppressing agents, fillers and the like, which are themselves free from formaldehyde, do not generate formaldehyde during the polymerization process, and do not generate or emit formaldehyde during the treatment of heat-resistant nonwovens.

EXAMPLES

These examples illustrate the effect on viscosity of varying modes of dispersing defatted soy flour. Soy flour is difficult to disperse and high viscosity dispersions (> 2,000 cps) are undesirable for potential commercial end-users. Thus, in the Examples below, soy flour dispersions with viscosities less than 1,000 cps are desirable, and viscosities of from 200 to 600 cps are most desirable.

TABLE 1

Viscosity of soy slurry with 0, 1% and 2% Acusol 420N, at varying shear rates (rpm)
1A: Stirred with a benchtop stirrer. 1B: Ground with a high shear Cowles dissolver

| Table 1A. Stirred Slurry Viscosity (cps) | | | | Table 1B. Ground Slurry Viscosity (cps) | | | |
| --- | --- | --- | --- | --- | --- | --- | --- |
| rpm | No Disp. | 1.0% Disp. | 2.0% Disp. | rpm | No Disp. | 1.0% Disp. | 2.0% Disp |
| 3 | 5,620 | 5,440 | 4,910 | 3 | 1,880 | 490 | 790 |
| 6 | 3,580 | 2,390 | 3,060 | 6 | 1,360 | 380 | 600 |
| 12 | 2,160 | 2,140 | 1,940 | 12 | 950 | 310 | 450 |
| 12 | 1,940 | 1,990 | 1,790 | 12 | 910 | 300 | 420 |
| 6 | 3,030 | 3,080 | 2,790 | 6 | 1,380 | 400 | 580 |
| 3 | 4,480 | 4,930 | 4,460 | 3 | 2,110 | 560 | 810 |

Table 1A. The aqueous soy flour slurry comprises 20% defatted soy flour (Prolia 200/70, with a 200 mesh particle size, and a PDI of 70), based on the total weight of the slurry, the aqueous slurry being formed by stirring with a laboratory benchtop stirrer in the presence of 0, 1%, and 2% of Acusot™ 420N (Disp.), a water soluble polyacid polymer. Table 1B. The aqueous soy flour slurry comprises 20% defatted soy flour, (Prolia 200/70, with a 200 mesh particle size, and a PDI of 70), based on the total weight of the slurry, the aqueous slurry being formed by high shear mixing on a Cowles dissolver in the presence of 0, 1%, and 2% of Acusot™ 420N (Disp.), a water soluble polyacid polymer.

The data in Tables 1 and 2 are also displayed as viscosity curves in FIGS. 1A and 1B. Table 1 (and FIG. 1A) shows that addition of polyacid dispersing agent, at a 1.0% or 2.0% level, has little or no effect in attempting to reduce the viscosity of the slurry if the slurry mixture is simply stirred. Comparing Table 2 data to that in Table 1, and also illustrated in FIG. 1B, it can be seen that grinding the soy flour slurry has a beneficial effect in reducing the viscosity of the slurry. For example, when measured at a shear rate of 12 rpm, viscosity is lowered to approximately 1,000 cps by using high shear grinding, compared to approximately 2,000 cps when simply stirring. This beneficial effect is greatly amplified when low levels (1-2%) of the water soluble polymer dispersing agent are also present in the high shear mixing process. Thus, measured at the same shear rate of 12 rpm, the viscosity can be reduced still further by grinding in the presence of the water soluble polymer, to approximately 300 cps. The latter is a far more desirable viscosity range that manufacturers can readily work with.

We claim:

1. An aqueous soy flour slurry comprising:
   i) from 10 to 60 weight percent defatted soy flour based on the total weight of the slurry,
   ii) from 0.2% to 4% by weight, based on the weight of polymeric active ingredient as a percentage of the total weight of the slurry, of a water soluble polymer dispersing agent made by the polymerization of ethylenically unsaturated monomers and having a molecular weight in the range of from 1,000 to 20,000, and
   iii) water,
   wherein the viscosity of the slurry is in the range from 200 to 2,000 cps at 25° C.

2. The slurry of claim 1 wherein the water soluble polymer dispersing agent is a homopolymer or copolymer comprising polymerized units derived from one or more monomers selected from the group consisting of (meth)acrylic acid, (meth)acrylates, maleic acid; anhydrides thereof; and salts thereof.

3. The slurry of claim 1 wherein the water soluble polymer dispersing agent comprises a water soluble phosphorous containing polymer.

4. The slurry of claim 1 wherein the water soluble polymer dispersing agent has molecular weight of less than 10,000.

5. The slurry of claim 1 wherein the water soluble polymer dispersing agent has molecular weight of less than 5,000.

6. A method for providing an aqueous soy flour slurry comprising the steps of:
   (a) forming an admixture comprising:
      (i) from 10 to 60 weight percent defatted soy flour based on the total weight of the slurry,
      (ii) from 0.2% to 4% by weight, based on the weight of polymeric active ingredient as a percentage of the total weight of the slurry, of a water soluble polymer dispersing agent made by the polymerization of ethylenically unsaturated monomers and having a molecular weight in the range of from 1,000 to 20,000, and
      (iii) water; and
   (b) mixing at high shear until the viscosity of the slurry is in the range from 200 to 2,000 cps.

7. The method of claim 6 wherein the mixing (b) is performed using a high shear Cowles-type dissolver.

8. The method of claim 6 wherein the mixing (b) is performed using a high-shear dispersing impeller.

9. The method of claim 6 wherein the water soluble polymer dispersing agent is a homopolymer or copolymer comprising polymerized units derived from one or more monomers selected from the group consisting of (meth)acrylic acid, (meth)acrylates, maleic acid; anhydrides thereof; and salts thereof.

10. The method of claim 6 wherein the water soluble polymer dispersing agent has molecular weight of less than 10,000.

* * * * *